US012165125B2

(12) United States Patent
Banga

(10) Patent No.: US 12,165,125 B2
(45) Date of Patent: Dec. 10, 2024

(54) METHOD AND SYSTEM FOR LOCATION-BASED TRANSACTIONS

(71) Applicant: JPMorgan Chase Bank, N.A., New York, NY (US)

(72) Inventor: Jasbir Banga, Swedesboro, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 135 days.

(21) Appl. No.: 17/982,851

(22) Filed: Nov. 8, 2022

(65) Prior Publication Data

US 2024/0152896 A1    May 9, 2024

(51) Int. Cl.
| | |
|---|---|
| *G06Q 40/00* | (2023.01) |
| *G06F 3/04817* | (2022.01) |
| *G06F 16/909* | (2019.01) |
| *G06Q 20/32* | (2012.01) |
| *G06Q 20/38* | (2012.01) |
| *G06Q 20/40* | (2012.01) |

(52) U.S. Cl.
CPC ..... *G06Q 20/3224* (2013.01); *G06F 3/04817* (2013.01); *G06F 16/909* (2019.01); *G06Q 20/389* (2013.01); *G06Q 20/4015* (2020.05)

(58) Field of Classification Search
CPC .............. G06Q 40/00; G06Q 20/4015; G06Q 20/389; G06F 16/909; G06F 3/04817
See application file for complete search history.

(56) References Cited

U.S. PATENT DOCUMENTS

| 10,185,948 B2 | 1/2019 | Kumaraguruparan et al. |
| 10,915,959 B2 * | 2/2021 | Sokol ............... H04W 4/029 |
| 11,810,017 B2 * | 11/2023 | Anderson ......... G06Q 20/385 |

(Continued)

FOREIGN PATENT DOCUMENTS

| AU | 2017/100328 A4 | 3/2017 |
| CA | 2950153 A1 | 6/2015 |

OTHER PUBLICATIONS

Smartphones as Practical and Secure Location Verification Tokens for Payments. C Marforio, N Karapanos, C Soriente, K Kostiainen . . . —NDSS, 2014—ethz.ch (Year: 2014).*

(Continued)

*Primary Examiner* — Lalita M Hamilton
(74) *Attorney, Agent, or Firm* — GREENBLUM & BERNSTEIN, P.L.C.

(57) ABSTRACT

A method, system, and computer-readable storage medium for implementing a location-based electronic transaction service are provided. The method includes: receiving a request for a first electronic transaction associated with a first transaction account; obtaining a geographic location associated with the request; transmitting a query for an identification of transaction accounts that are registered to conduct location-based electronic transactions at the geographic location; receiving the identification of transaction accounts; and utilizing the transaction account database to determine whether the first transaction account is registered to conduct the location-based electronic transactions. When the first transaction account is registered to conduct the location-based electronic transactions, the method further includes: retrieving, from a transaction history database, a first transaction history of the requester; and utilizing the first transaction history to suggest a third transaction account and proposed details of the first electronic transaction.

20 Claims, 6 Drawing Sheets

(56) References Cited

U.S. PATENT DOCUMENTS

| | | | |
|---|---|---|---|
| 11,978,029 B1* | 5/2024 | Bowers | G06Q 20/405 |
| 2017/0345009 A1* | 11/2017 | Unnerstall | G06Q 20/407 |
| 2019/0095898 A1 | 3/2019 | Bhatia | |
| 2021/0012337 A1 | 1/2021 | Gosh et al. | |
| 2023/0230061 A1* | 7/2023 | Creatore | G06Q 20/3276 |
| | | | 705/21 |
| 2024/0152896 A1* | 5/2024 | Banga | G06Q 20/389 |

OTHER PUBLICATIONS

Extended European Search Report from the European Patent Office (EPO) in European Pat. Appl. No. 23207927.7, dated Mar. 6, 2024.

\* cited by examiner

METHOD AND SYSTEM FOR LOCATION-BASED TRANSACTIONS

BACKGROUND

1. Field of the Invention

The field of the invention disclosed herein generally relates to a location-based electronic transaction service and, more particularly, to a method, system, and computer-readable storage medium for implementing a location-based electronic transaction service that improves the overall speed, ease, and user experience of a location-based transaction.

2. Background of the Invention

Businesses and individuals often visit the geographical locations of other businesses and individuals in order to obtain or provide services, execute transactions, or both. In the modern world, the settlement of such services and transactions are often executed by digital means (for the purposes of this disclosure, a settlement can be understood to refer to the settling of one or more affairs). For example, businesses and individuals may utilize an electronic device, such as a mobile device or computer, to have an application execute a transaction with another business or individual. Such an application may be, but is not limited to, file transfer applications such as AirDrop and Wi-Fi Direct, payment applications such as Zelle and PayPal, and any other application capable of performing an electronic transaction. Frequently, such a transaction is a recurring event, and the nature of the transaction generally tends to be the same as that of a preceding transaction executed between its transactors. Similarly, businesses and individuals that receive or provide services, execute transactions, or both, by visiting another business or individual's geographical location, may execute the settlement of such services, transactions, or both, by digital means. Such a visit has the tendency of being a recurring event as well, where the nature of its settlement is generally the same as that of a preceding transaction that was executed between the transactors.

As a result of these tendencies, there is an opportunity for the technology of such transactions to be advanced via a location-based electronic transaction service that improves the overall speed, ease, and user experience of executing such transactions.

Accordingly, to improve existing technology, by making the transaction faster and easier for either party of a location-based transaction, the proposed invention suggests or prefills the details of the transaction, including a likely party to the transaction, by looking up the geographical location of the transacting application's use and, then, looking up a history of transactions that have been executed between the likely transactors. For a recurring transaction, the details of that transaction may be suggested or prefilled to improve the speed and ease of the transaction. The lookup may utilize a directory of transaction accounts for the businesses and individuals that are located in the geographic location where the transaction is initiated and may employ a mapping application service, such as Google Maps, Apple Maps, Bing Maps, etc.

Additionally, for businesses or individuals that are searchable on popular mapping application services (e.g., Google Maps, Apple Maps, Bing Maps, etc.), the proposed invention may improve such a mapping application service by having the service's map(s) include an icon for each of the searchable businesses or individuals that are presented on the map and, thereby, has the service's map(s) enable a transaction with a searchable business or individual to be initiated directly from the map. For example, upon clicking the icon of a searchable business or individual that is presented within the map, the user may be directed to a transaction application of their choice and, based on the user's transaction history, the user may be proffered a rapid transaction and improved user experience.

SUMMARY

The present disclosure, through one or more of its various aspects, embodiments, and/or specific features or sub-component, provides, inter alia, various systems, servers, devices, methods, media, programs and platforms for operating an application program interface-based content management system.

According to an aspect of the present disclosure, a method is provided for implementing a location-based electronic transaction service that may comprise a processor and memory. The method may comprise: receiving, by the processor, from a requester, a request for a first electronic transaction; obtaining, by the processor, a first geographic location associated with the request for the electronic transaction; transmitting, by the processor, to a transaction account database, a query for an identification of a plurality of second transaction accounts that are registered to conduct location-based electronic transactions at the first geographic location; receiving, by the processor, from the transaction account database, the identification of the plurality of second transaction accounts; utilizing, by the processor, the transaction account database to determine whether the first transaction account is registered to conduct the location-based electronic transactions; and prompting, by the processor, the requester to execute the first electronic transaction. The first electronic transaction may be associated with a first transaction account of the requester. When the first transaction account is registered to conduct the location-based electronic transactions: retrieving, by the processor, from a transaction history database, a first transaction history of the first transaction account; utilizing, by the processor, the first transaction history to suggest a third transaction account and proposed details of the first electronic transaction; and prompting, by the processor, the requester to make any necessary changes with respect to the third transaction account and the proposed details of the first electronic transaction. Alternatively, when the first transaction account is not registered to conduct the location-based electronic transactions: prompting, by the processor, the requester to choose the third transaction account from the plurality of second transaction accounts; and prompting, by the processor, the requester to provide proposed the details of the first electronic transaction. The first transaction history may be associated with the first geographic location. The first electronic transaction may be directed to the third transaction account.

The method's prompting the requester to choose the third transaction account from the plurality of second transaction accounts may comprise: utilizing, by the processor, a graphical user interface (GUI) to display a map that comprises the first geographic location; and superimposing, by the processor, icons on top of the map. There may be a one-to-one correspondence between each of the icons and each transaction account of the plurality of second transaction accounts; and choosing the third transaction account is performable by selecting one of the icons.

The method's suggesting of the third transaction account and the proposed details of the first electronic transaction may comprise: determining, by the processor, how many of the plurality of second transaction accounts correspond to the first transaction history; and when at least one of the plurality of second transaction accounts corresponds to a transaction of the first transaction history, utilizing, by the processor, the at least one of the plurality of second transaction accounts and the transaction of the first transaction history to perform the suggesting of the third transaction account and the proposed details of the first electronic transaction, respectively.

When none of the previous transactions of the requester corresponds to the first geographic location, the method's prompting the requester to choose the third transaction account may comprise: utilizing, by the processor, a graphical user interface (GUI) to display a map that comprises the first geographic location; and superimposing, by the processor, icons on top of the map. There may be a one-to-one correspondence between each of the icons and each transaction account of the plurality of second transaction accounts; and choosing of the third transaction account is performable by selecting one of the icons.

In the method, a most recent one of the previous transactions of the requester that corresponds to the first geographic location may be used for performing the suggesting of the third transaction account and the proposed details of the first electronic transaction.

The method's first electronic transaction may comprise: a debit from the first transaction account of the requester; and a credit to the third transaction account.

Alternatively, the method's first electronic transaction may comprise: a credit to the first transaction account of the requester; and a debit from the third transaction account.

In the method, when the first transaction account is not registered to conduct the location-based electronic transactions, the method may further comprise: when the requester executes the first electronic transaction, registering the first transaction account to conduct the location-based electronic transactions.

In the method, the first geographic location may be obtained from at least one from among a mobile network and a global positioning system (GPS) location service.

The method's location-based electronic transaction service may further comprise: an electronic transaction location service that communicates with the transaction account database; and an electronic transaction processing service that communicates with the transaction history database.

According to another aspect of the present disclosure, a system is provided for implementing a location-based electronic transaction service that may comprise a processor and memory, the system comprising: a transaction history database that stores a plurality of transaction histories and associated geographic locations; a transaction account database that stores an identification of a plurality of transaction accounts and associated geographic locations; and the location-based electronic transaction service. The processor may be configured to: receive, from a requester, a request for a first electronic transaction; obtain a first geographic location associated with the request for the electronic transaction; transmit, to the transaction account database, a query for an identification of a plurality of second transaction accounts that are registered to conduct location-based electronic transactions at the first geographic location; receive, from the transaction account database, the identification of the plurality of second transaction accounts; utilize the transaction account database to determine whether the first transaction account is registered to conduct the location-based electronic transactions; and prompt the requester to execute the first electronic transaction. The first electronic transaction may be associated with a first transaction account of the requester. When the first transaction account is registered to conduct the location-based electronic transactions: retrieve, from the transaction history database, a first transaction history of the first transaction account; utilize the first transaction history to suggest a third transaction account and proposed details of the first electronic transaction; and prompt the requester to make any necessary changes with respect to the third transaction account and the proposed details of the first electronic transaction. Alternatively, when the first transaction account is not registered to conduct the location-based electronic transactions: prompt the requester to choose the third transaction account from the plurality of second transaction accounts; and prompt the requester to provide the proposed details of the first electronic transaction. The first transaction history may be associated with the first geographic location. The first electronic transaction may be directed to the third transaction account.

The system's prompt the requester to choose the third transaction account from plurality of second transaction accounts may comprise: utilizing a graphical user interface (GUI) to display a map that comprises the first geographic location; and superimposing icons on top of the map. There may be a one-to-one correspondence between each of the icons and each transaction account of the plurality of second transaction accounts; and choosing of the third transaction account is performable by selecting one of the icons.

The system's suggesting of the third transaction account and the proposed details of the electronic transaction may comprise: determining how many of the plurality of second transaction accounts correspond to the first transaction history; and when at least one of the plurality of second transaction accounts corresponds to a transaction of the first transaction history, utilizing the at least one of the plurality of second transaction accounts and the transaction of the first transaction history to perform the suggesting of the third transaction account and the proposed details of the first electronic transaction, respectively.

When none of the previous transactions of the requester corresponds to the first geographic location, the system's prompt the requester to choose the third transaction account may comprise: utilizing a graphical user interface (GUI) to display a map that comprises the first geographic location; and superimposing icons on top of the map. There may be a one-to-one correspondence between each of the icons and each transaction account of the plurality of second transaction accounts; and choosing of the third transaction account is performable by selecting one of the icons.

In the system, a most recent one of the previous transactions of the requester that corresponds to the first geographic location may be used for performing the suggesting of the third transaction account and the proposed details of the first electronic transaction.

The system's first electronic transaction may comprise: a debit from the first transaction account of the requester; and a credit to the third transaction account.

The system's first electronic transaction may comprise: a credit to the first transaction account of the requester; and a debit from the third transaction account.

In the system, when the first transaction account is not registered to conduct the location-based electronic transactions, the processor may be further configured to: register the first transaction account to conduct the location-based electronic transactions when the requester executes the first electronic transaction.

The system's the first geographic location may be obtained from at least one from among a mobile network and a global positioning system (GPS) location service.

The system's location-based electronic transaction service may further comprise: an electronic transaction location service that communicates with the transaction account database; and an electronic transaction processing service that communicates with the transaction history database.

According to yet a further aspect of the present disclosure, a non-transitory computer-readable storage medium storing instructions is provided for implementing a location-based electronic transaction service that may comprise a processor and memory. The instructions may comprise: receiving, by the processor, from a requester, a request for a first electronic transaction; obtaining, by the processor, a first geographic location associated with the request for the electronic transaction; transmitting, by the processor, to a transaction account database, a query for an identification of a plurality of second transaction accounts that are registered to conduct location-based electronic transactions at the first geographic location; receiving, by the processor, from the transaction account database, the identification of the plurality of second transaction accounts; utilizing, by the processor, the transaction account database to determine whether the first transaction account is registered to conduct the location-based electronic transactions; and prompting, by the processor, the requester to execute the first electronic transaction. The first electronic transaction may be associated with a first transaction account of the requester. When the first transaction account is not registered to conduct the location-based electronic transactions: prompting, by the processor, the requester to choose a third transaction account from the plurality of second transaction accounts; and prompting, by the processor, the requester to provide proposed details of the first electronic transaction. Alternatively, when the first transaction account is registered to conduct the location-based electronic transactions: retrieving, by the processor, from a transaction history database, a first transaction history of the requester; utilizing, by the processor, the first transaction history to suggest the third transaction account and the proposed details of the first electronic transaction; and prompting, by the processor, the requester to make any necessary changes with respect to the third transaction account and the proposed details of the first electronic transaction. The first transaction history may be associated with the first geographic location. The first electronic transaction may be directed to the third transaction account.

In the non-transitory computer-readable storage medium, the instructions' prompting the requester to choose the third transaction account from the plurality of second transaction accounts may comprise: utilizing, by the processor, a graphical user interface (GUI) to display a map that comprises the first geographic location; and superimposing, by the processor, icons on top of the map. There may be a one-to-one correspondence between each of the icons and each transaction account of the plurality of second transaction accounts; and choosing of the third transaction account is performable by selecting one of the icons.

In the non-transitory computer-readable storage medium, the instructions' suggesting of the third transaction account and the proposed details of the first electronic transaction may comprise: determining, by the processor, how many previous transactions of the requester correspond to the first geographic location; and when at least one of the previous transactions of the requester corresponds to the first geographic location, utilizing, by the processor, the at least one of the previous transactions of the requester to perform the suggesting of the third transaction account and the proposed details of the first electronic transaction.

In the non-transitory computer-readable storage medium, when none of the previous transactions of the requester corresponds to the first geographic location, the instructions' prompting the requester to choose the third transaction account may comprise: utilizing, by the processor, a graphical user interface (GUI) to display a map that comprises the first geographic location; and superimposing, by the processor, icons on top of the map. There may be a one-to-one correspondence between each of the icons and each transaction account of the plurality of second transaction accounts; and choosing of the third transaction account is performable by selecting one of the icons.

In the non-transitory computer-readable storage medium's instructions, a most recent one of the previous transactions of the requester that corresponds to the first geographic location may be used for performing the suggesting of the third transaction account and the proposed details of the first electronic transaction.

In the non-transitory computer-readable storage medium, the instructions' first electronic transaction may comprise: a debit from the first transaction account of the requester; and a credit to the third transaction account.

Alternatively, in the non-transitory computer-readable storage medium, the instructions' first electronic transaction may comprise: a credit to the first transaction account of the requester; and a debit from the third transaction account.

In the non-transitory computer-readable storage medium's instructions, when the first transaction account is not registered to conduct the location-based electronic transactions, the instructions may further comprise: registering the first transaction account to conduct the location-based electronic transactions when the requester executes the first electronic transaction.

In the non-transitory computer-readable storage medium's instructions, the first geographic location may be obtained from at least one from among a mobile network and a global positioning system (GPS) location service.

In the non-transitory computer-readable storage medium, the instructions' location-based electronic transaction service may further comprise: an electronic transaction location service that communicates with the transaction account database; and an electronic transaction processing service that communicates with the transaction history database.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
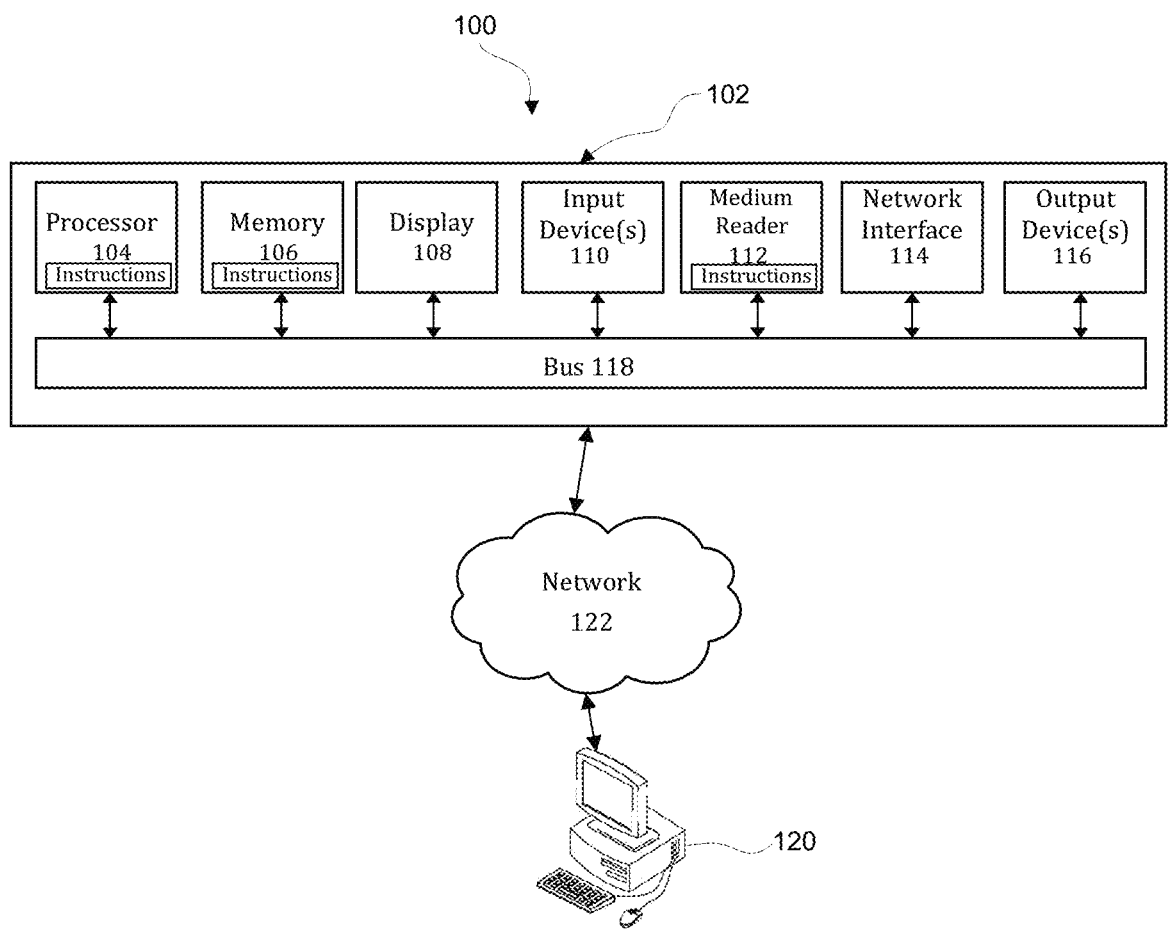
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for implementing a location-based electronic transaction service that improves the overall speed, ease, and user experience of a location-based transaction.

Figure 2:
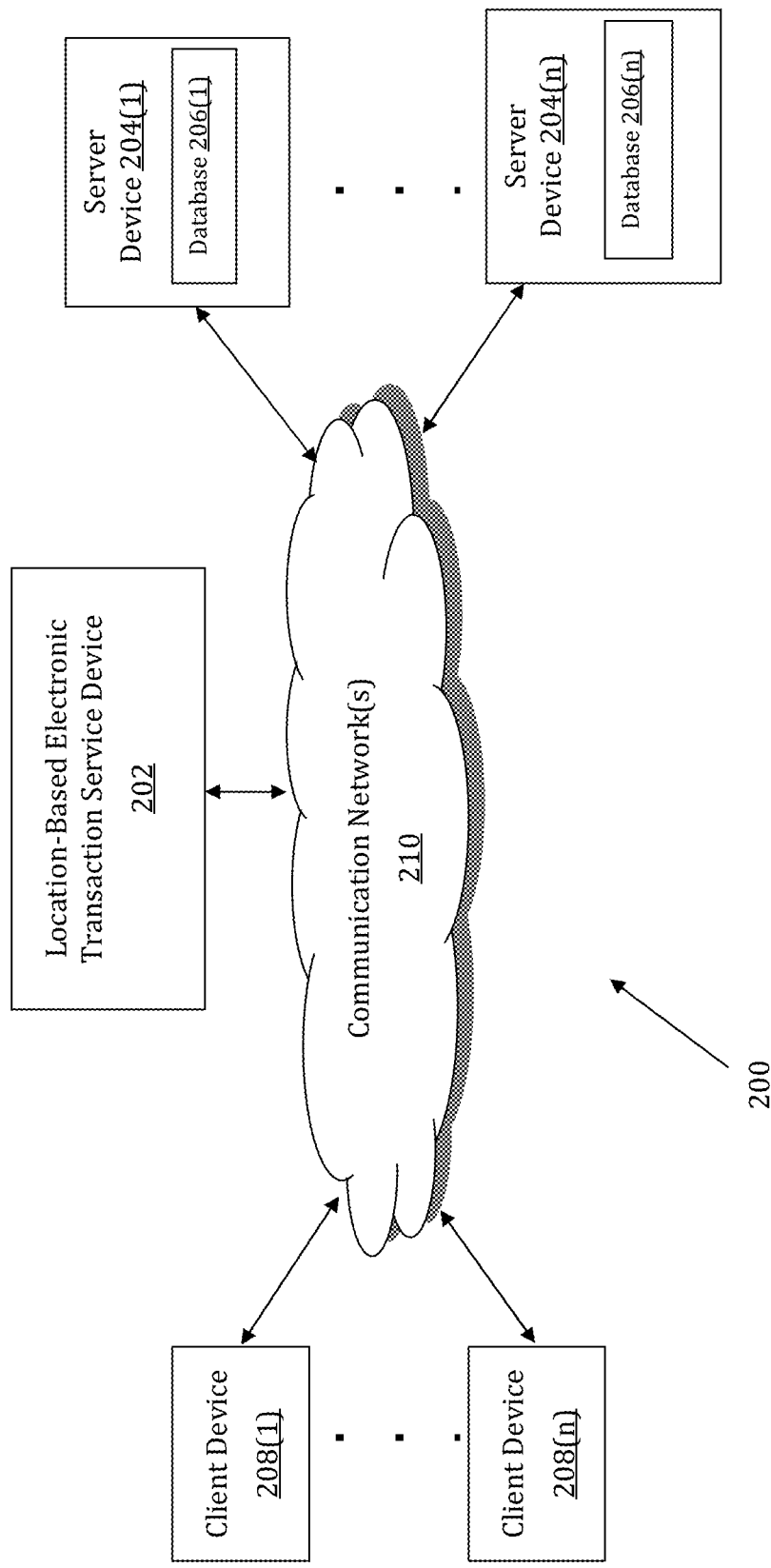
FIG. 2 illustrates an exemplary diagram of a network environment.

Referring to FIG. 2, a schematic of an exemplary network environment 200 for implementing a location-based electronic transaction service that improves the overall speed, ease, and user experience of a location-based transaction is illustrated. In an exemplary embodiment, the method is executable on any networked computer platform, such as, for example, a personal computer (PC).

The method for implementing a location-based electronic transaction service may be implemented by a location-based electronic transaction service (LBETS) device 202. The LBETS device 202 may be the same or similar to the computer system 102 as described with respect to FIG. 1. The LBETS device 202 may be a rack-mounted server in a datacenter, an embedded microcontroller (MCU) in an electronic device, or another type of headless system, which is a computer system or device that is configured to operate without a monitor, keyboard and mouse. The LBETS device 202 may store one or more applications that can include executable instructions that, when executed by the LBETS device 202, cause the LBETS device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LBETS device 202 itself, may be located in virtual server(s) running in a cloud-based computing environment rather than being tied to one or more specific physical network computing devices. Also, the application(s) may be running in one or more virtual machines (VMs) executing on the LBETS device 202. Additionally, in one or more embodiments of this technology, virtual machine(s) running on the LBETS device 202 may be managed or supervised by a hypervisor.

In the network environment 200 of FIG. 2, the LBETS device 202 is coupled to a plurality of server devices 204(1)-204(n) that hosts a plurality of databases 206(1)-206(n), and also to a plurality of client devices 208(1)-208(n) via communication network(s) 210. A communication interface of the LBETS device 202, such as the network interface 114 of the computer system 102 of FIG. 1, operatively couples and communicates between the LBTS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LBETS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and LBETS devices that efficiently implement a method for a location-based electronic transaction service that improves the overall speed, ease, and user experience of a location-based transaction.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LBETS device 202 may be a standalone device or integrated with one or more other devices or apparatuses, such as one or more of the server devices 204(1)-204(n), for example. In one particular example, the LBETS device 202 may include or be hosted by one of the server devices 204(1)-204(n), and other arrangements are also possible. As another example, the LBETS device 202 may be integrated with one or more other devices or apparatuses, such as one or more of the client devices 208(1)-208(n). Moreover, one or more of the devices of the LBETS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LBETS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a Transaction Account Database and a Transaction History Database.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the LBETS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LBETS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the LBETS device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LBETS device 202, the server devices 204(1)-204(n), the databases 206(1)-206(n), or the client devices 208(1)-208(n), for example, may be configured to operate as virtual instances on the same physical machine. In other words, one or more of the LBETS device 202, the server devices 204(1)-204(n), the databases 206(1)-206(n), or the client devices 208(1)-208(n) may operate on the same physical device rather than as separate devices communicating through communication network(s) 210. Additionally, there may be more or fewer LBETS devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
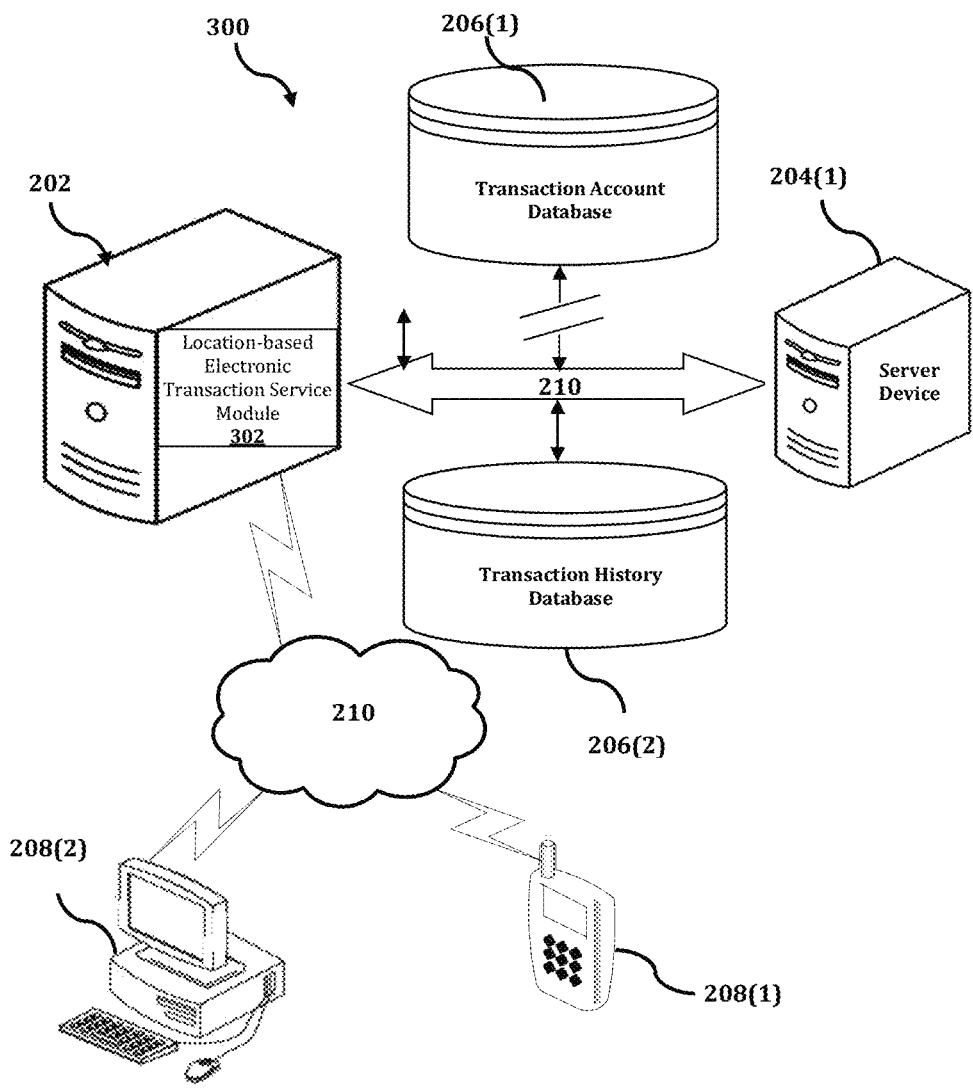
FIG. 3 shows an exemplary system for implementing a location-based electronic transaction service that improves the overall speed, ease, and user experience of a location-based transaction.

The LBETS device 202 is described and illustrated in FIG. 3 as including location-based electronic transaction service module 302, although it may include other rules, policies, modules, databases, or applications, for example. As will be described below, location-based electronic transaction service module 302 is configured to implement a method implementing a location-based electronic transaction service that improves the overall speed, ease, and user experience of a location-based transaction. Location-based electronic transaction service module 302 may include software that is based on a microservices architecture.

Location-based electronic transaction service module 302 may be integrated with one or more devices or apparatuses, such as client devices 208(1)-208(n), where location-based electronic transaction service module 302 may be implemented as an application or as an addon or plugin to another application of the one or more devices or apparatuses, and where location-based electronic transaction service module 302 may execute in the background.

An exemplary process 300 for implementing a location-based electronic transaction service by utilizing the network environment of FIG. 2 is illustrated as being executed in FIG. 3. Specifically, a first client device 208(1) and a second client device 208(2) are illustrated as being in communication with LBETS device 202. In this regard, the first client device 208(1) and the second client device 208(2) may be "clients" of the LBETS device 202 and are described herein as such. Nevertheless, it is to be known and understood that the first client device 208(1) and/or the second client device 208(2) need not necessarily be "clients" of the LBETS device 202, or any entity described in association therewith herein. Any additional or alternative relationship may exist between either or both of the first client device 208(1) and the second client device 208(2) and the LBETS device 202, or no relationship may exist.

Further, LBETS device 202 is illustrated as being able to access transaction account database 206(1), and transaction history database 206(2). LBETS device 202 may comprise an electronic transaction location service that communicates with transaction account database 206(1). In addition, LBETS device 202 may comprise an electronic transaction processing service that communicates with transaction history database 206(2). The location-based electronic transaction service module 302 may be configured to access these databases for implementing a location-based electronic transaction service that improves the overall speed, ease, and user experience of a location-based transaction.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization. The first client device 208(1) represent, for example, one or more computer systems of a department within the organization. Of course, the first client device 208(1) may include one or more of any of the devices described herein. The second client device 208(2) may be, for example, one or more computer systems of another department within the organization. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the LBETS device 202 via broadband or cellular communication. Of course, these embodiments are merely exemplary and are not limiting or exhaustive.

Location-based electronic transaction service module 302 may execute a process for implementing a location-based electronic transaction service that improves the overall speed, ease, and user experience of a location-based transaction. An exemplary process for implementing a location-based electronic transaction service is generally indicated at flowchart 400 in FIG. 4, at flowchart 500 in FIG. 5, and at flowchart 600 in FIG. 6.

Figure 4:
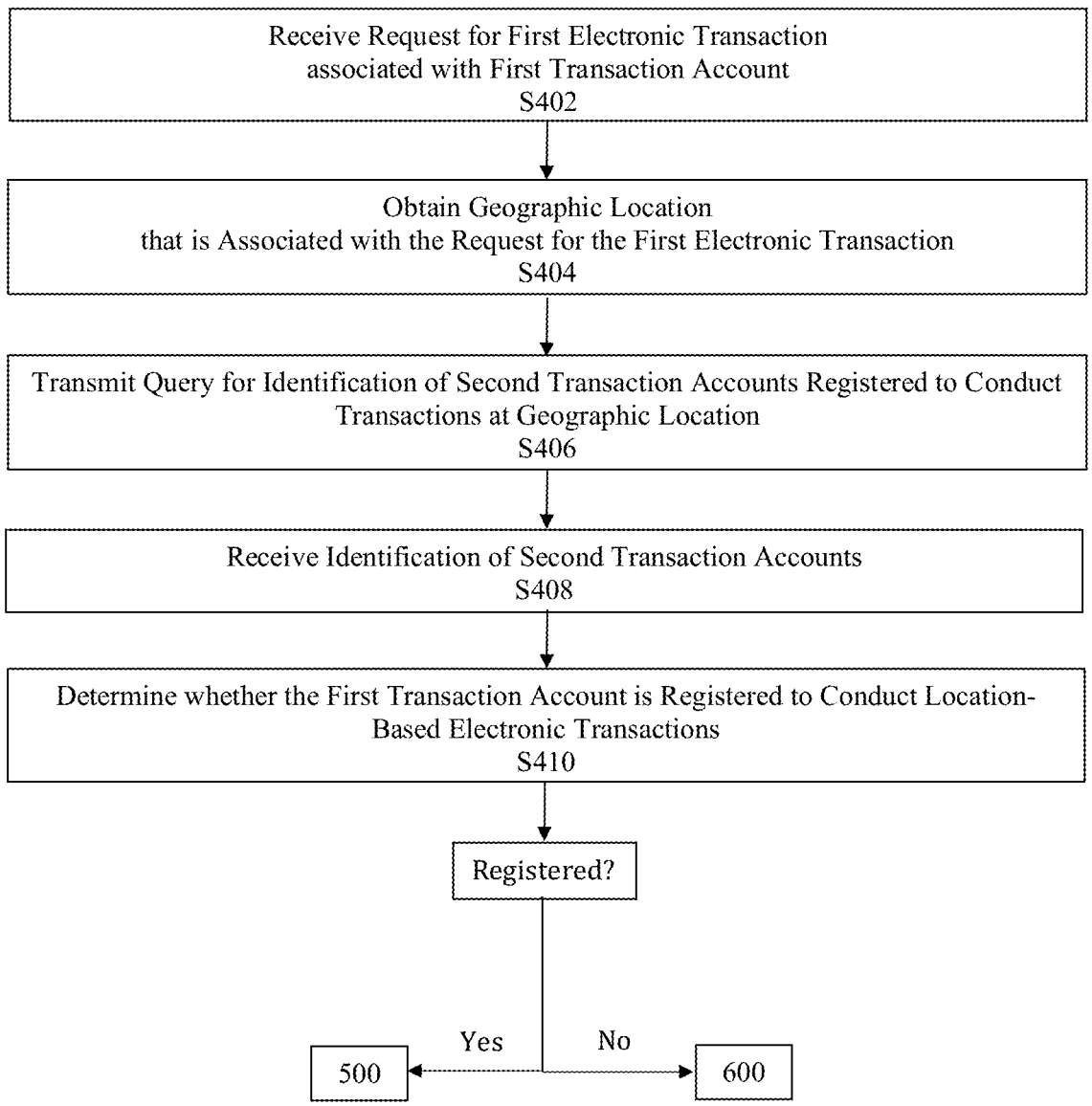
FIG. 4 is a flowchart of an exemplary process for implementing a location-based electronic transaction service that improves the overall speed, ease, and user experience of a location-based transaction.

In process 400 of FIG. 4, at step S402, location-based electronic transaction service module 302 receives a request for a first electronic transaction. The request for the first electronic transaction is received from a requester. The requester may be using a device such as client device 208(1) or client device 208(2) to submit the request for the first electronic transaction. The request for the first electronic transaction is associated with a first transaction account. The first transaction account that is associated with the request for the first electronic transaction, may be a transaction account that belongs to the requester.

At step S404, location-based electronic transaction service module 302 obtains a first geographic location associated with the request for the first electronic transaction. The first geographic location may be obtained from a mobile network, a global positioning system (GPS), or any other service capable of providing the geographic location associated with the request for the first electronic transaction. The geographic location associated with the request for the first electronic transaction may be the geographic location from which the requester submitted the request for the first electronic transaction.

At step S406, location-based electronic transaction service module 302 transmits a query for an identification of a plurality of second transaction accounts that are registered to conduct location-based electronic transactions at the first geographic location. The query for an identification of a plurality of second transaction accounts is transmitted to a transaction account database, such as transaction account database 206(1).

In response to the query for an identification of the plurality of second transaction accounts, a transaction account database, such as transaction account database 206(1), may be searched for an identification of transaction accounts that are registered to conduct location-based electronic transactions at the first geographic location. The transaction account database may store a plurality of transaction accounts that are registered to conduct location-based electronic transactions. The transaction account database may also associate one or more geographic locations to each of the plurality of stored transaction accounts that are registered to conduct location-based electronic transactions. The associated geographic locations may include geographic locations from which one or more associated stored transaction accounts is registered to conduct location-based electronic transactions. Therefore, in response to the query for an identification of the plurality of second transaction accounts, the transaction account database may be searched for the first geographic location. Each of the one or more stored transaction accounts that is associated with a geographic location that matches the first geographic location, may be determined to be one of the plurality of second transaction accounts.

At step S408, location-based electronic transaction service module 302 receives the identification of a plurality of second transaction accounts that are registered to conduct location-based electronic transactions at the first geographic location. The identification of a plurality of second transaction accounts is transmitted from the transaction account database.

At step S410, location-based electronic transaction service module 302 also utilizes a transaction account database, such as transaction account database 206(1), to determine whether the first transaction account is registered to conduct location-based electronic transactions. To determine whether the first transaction account is registered to conduct location-based electronic transactions, location-based electronic transaction service module 302 may transmit a query for such information to a transaction account database, such as transaction account database 206(1).

In response to a query to determine whether the first transaction account is registered to conduct location-based electronic transactions, the transaction account database may be searched for an identification of the first transaction account. For example, the transaction account database may store an identification of a plurality of registered transaction accounts. Thereby, when the transaction account database does not store a particular transaction account, it may be determined that that particular transaction account is not registered to conduct location-based electronic transactions.

Figure 5:
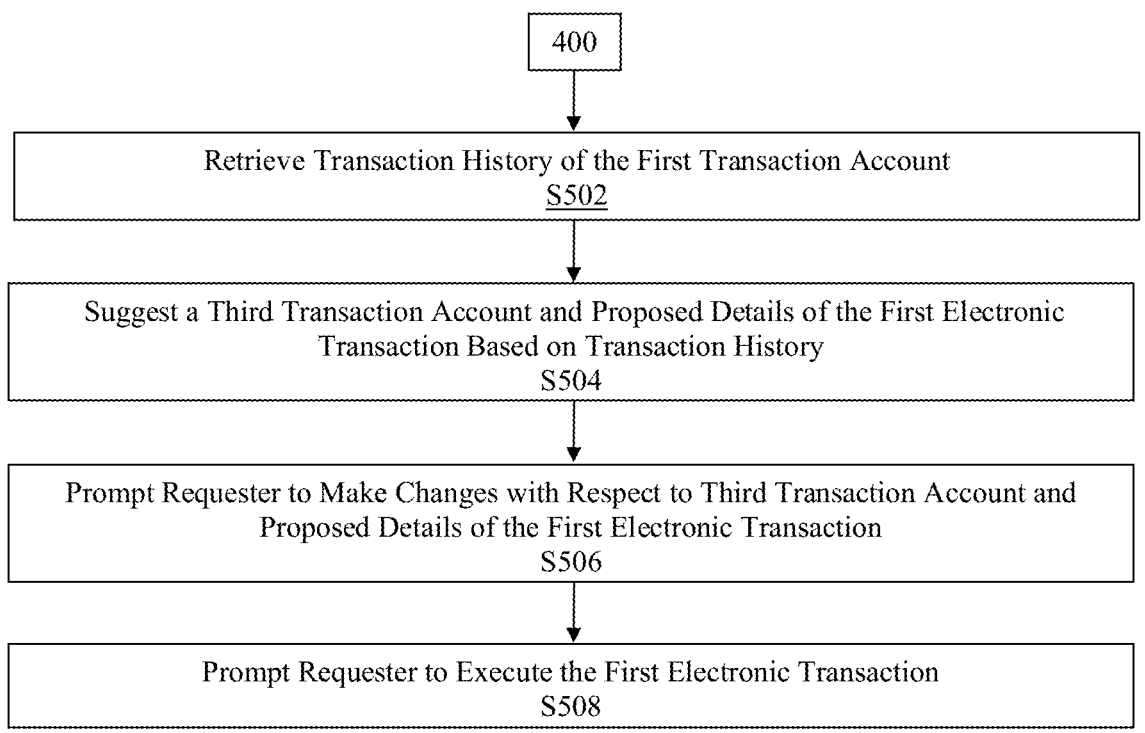
FIG. 5 is a flowchart of an exemplary process for conducting a location-based electronic transaction for a registered user.

When the first transaction account is registered to conduct location-based transactions, the flow of process 400 then proceeds to process 500 of FIG. 5. Alternatively, when the first transaction account is not registered to conduct location-based transactions, the flow of process 400 instead proceeds to process 600 of FIG. 6.

In process 500 of FIG. 5, at step S502, location-based electronic transaction service module 302 retrieves a first transaction history of the first transaction account. The first transaction history includes one or more previous transactions of the first transaction account. In addition, the one or more previous transactions of the first transaction history are limited to previous transactions that were executed at the first geographic location. Moreover, at step S502, location-based electronic transaction service module 302 retrieves the first transaction history from a transaction history database, such as transaction history database 206(2).

At step S502, location-based electronic transaction service module 302 may retrieve the first transaction history from the transaction history database by transmitting a query to such database. In response to such a query for the first transaction history, the transaction history database may transmit the first transaction history to location-based electronic transaction service module 302.

At step S504, location-based electronic transaction service module 302 utilizes the first transaction history to suggest a third transaction account, and the third transaction account that is suggested may be determined from a most recent transaction in the first transaction history. Either additionally or alternatively, the third transaction account that is suggested may be one of the plurality of second transaction accounts that is associated with the first transaction history. Additionally or alternatively, the third transaction account that is suggested may be the one of the plurality of second transaction accounts that is most frequently associated with a transaction of the first transaction history. The first electronic transaction will be directed to the third transaction account.

In addition, at step S504, location-based electronic transaction service module 302 also utilizes the first transaction history to suggest proposed details of the first electronic transaction. The proposed details of the first electronic transaction may be determined from the first transaction history retrieved in step S502.

At step S506, location-based electronic transaction service module 302 prompts the requester to make any necessary changes with respect to the third transaction account and proposed details of the first electronic transaction. Any necessary changes with respect to the third transaction account and the proposed details of the first electronic transaction may comprise one or more changes that are necessary for the third transaction account, as well as the details of the first electronic transaction, to accurately reflect the requester's intentions for the first electronic transaction.

At step S508, location-based electronic transaction service module 302 prompts the requester to execute the first electronic transaction. As a result of the requester's execution of the first electronic transaction, location-based electronic transaction service module 302 may register the first transaction account to conduct location-based electronic transactions.

Figure 6:
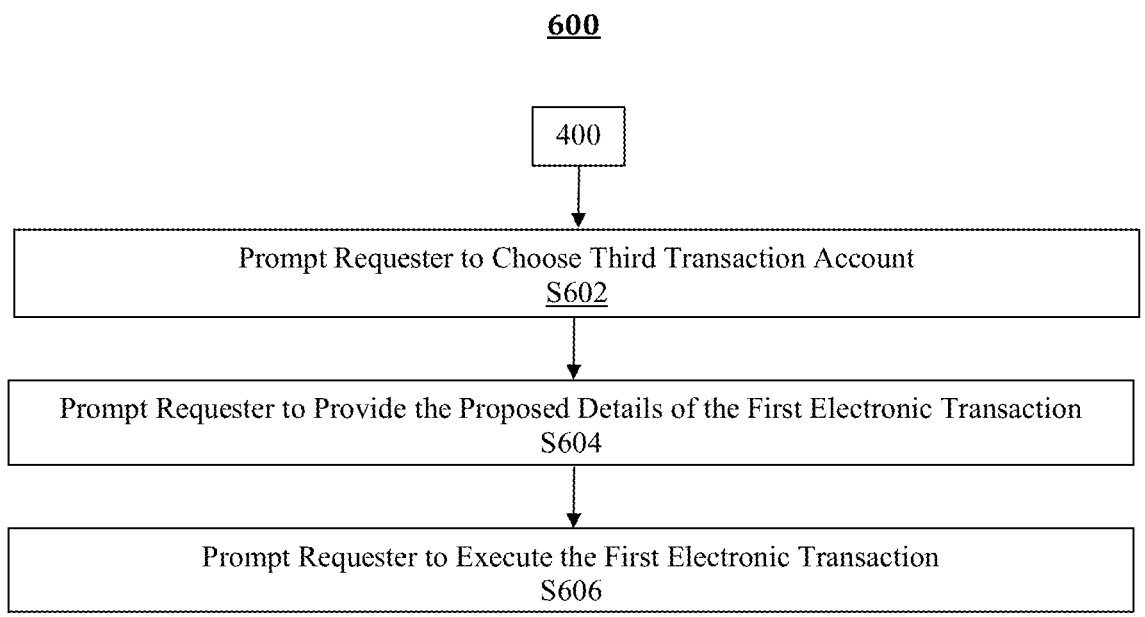
FIG. 6. is a flowchart of an exemplary process for conducting a location-based electronic transaction for an unregistered user.

In process 600 of FIG. 6, at step S602, location-based electronic transaction service module 302 prompts the requester to choose the third transaction account from the plurality of second transaction accounts. Prompting the requester to choose the third transaction account from the plurality of second transaction accounts may comprise: utilizing, by the processor, a graphical user interface (GUI) to display a map that comprises the first geographic location; and superimposing, by the processor, icons on top of the map. In addition, there may be a one-to-one correspondence between each of the icons and each of the second transaction accounts, and the third transaction account may be chosen by selecting one of the icons.

At step S604, location-based electronic transaction service module 302 prompts the requester to choose the details of the first electronic transaction.

At step S606, location-based electronic transaction service module 302 prompts the requester to execute the first electronic transaction.

Accordingly, with this technology, a process for implementing a location-based electronic transaction service that improves the overall speed, ease, and user experience of location-based transactions, is provided.

Generally, the first electronic transaction may comprise: a debit from the first transaction account of the requester; and a credit to the third transaction account. Alternatively, the first electronic transaction may comprise: a credit to the first transaction account of the requester; and a debit from the third transaction account.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The invention claimed is:

1. A method for implementing a location-based electronic transaction service that comprises a processor and memory, the method comprising:
  receiving, by the processor, from a requester, a request for a first electronic transaction, wherein the first electronic transaction is associated with a first transaction account of the requester;

obtaining, by the processor, a first geographic location associated with the request for the first electronic transaction;

transmitting, by the processor, to a transaction account database, a query for an identification of a plurality of second transaction accounts that are registered to conduct location-based electronic transactions at the first geographic location;

receiving, by the processor, from the transaction account database, the identification of the plurality of second transaction accounts;

utilizing, by the processor, the transaction account database to determine whether the first transaction account is registered to conduct the location-based electronic transactions;

when the first transaction account is not registered to conduct the location-based electronic transactions:
prompting, by the processor, the requester to choose the third transaction account from the plurality of second transaction accounts, wherein the first electronic transaction will be directed to the third transaction account, and wherein the prompting the requester to choose the third transaction account from the plurality of second transaction accounts comprises:
utilizing, by the processor, a graphical user interface (GUI) to display a map that comprises the first geographic location; and
superimposing, by the processor, icons on top of the map, wherein there is a one-to-one correspondence between each of the icons and each transaction account of the plurality of second transaction accounts, and wherein choosing the third transaction account is performable by selecting one of the icons;
prompting, by the processor, the requester to provide proposed the details of the first electronic transaction; and
prompting, by the processor, the requester to execute the first electronic transaction; and when the first transaction account is registered to conduct the location-based electronic transactions:
retrieving, by the processor, from a transaction history database, a first transaction history of the first transaction account, wherein the first transaction history is associated with the first geographic location;
utilizing, by the processor, the first transaction history to suggest a third transaction account and proposed details of the first electronic transaction, wherein the first electronic transaction will be directed to the third transaction account;
prompting, by the processor, the requester to make any necessary changes with respect to the third transaction account and the proposed details of the first electronic transaction; and
prompting, by the processor, the requester to execute the first electronic transaction.

2. The method of claim 1, wherein the suggesting of the use of the third transaction account and the proposed details of the first electronic transaction comprises:
determining, by the processor, how many of the plurality of second transaction accounts correspond to the first transaction history; and
when at least one of the plurality of second transaction accounts corresponds to a transaction of the first transaction history, utilizing, by the processor, the at least one of the plurality of second transaction accounts and the transaction of the first transaction history to perform the suggesting of the third transaction account and the proposed details of the first electronic transaction, respectively.

3. The method of claim 2, wherein when none of the previous transactions of the requester corresponds to the first geographic location, the prompting the requester to choose the third transaction account comprises:
utilizing, by the processor, a graphical user interface (GUI) to display a map that comprises the first geographic location; and
superimposing, by the processor, icons on top of the map, wherein:
there is a one-to-one correspondence between each of the icons and each transaction account of the plurality of second transaction accounts; and
choosing the third transaction account is performable by selecting one of the icons.

4. The method of claim 2, wherein a most recent one of the previous transactions of the requester that corresponds to the first geographic location is used for performing the suggesting of the third transaction account and the proposed details of the first electronic transaction.

5. The method of claim 1, wherein the first electronic transaction comprises:
a debit from the first transaction account of the requester; and
a credit to the third transaction account.

6. The method of claim 1, wherein the first electronic transaction comprises:
a credit to the first transaction account of the requester; and
a debit from the third transaction account.

7. The method of claim 1, wherein when the first transaction account is not registered to conduct the location-based electronic transactions, the method further comprises:
when the requester executes the first electronic transaction, registering the first transaction account to conduct the location-based electronic transactions.

8. The method of claim 1, wherein the location-based electronic transaction service further comprises:
an electronic transaction location service that communicates with the transaction account database; and
an electronic transaction processing service that communicates with the transaction history database.

9. A system for implementing a location-based electronic transaction service that comprises a processor and memory, the system comprising:
a transaction history database that stores a plurality of transaction histories and associated geographic locations;
a transaction account database that stores an identification of a plurality of transaction accounts and associated geographic locations; and
the location-based electronic transaction service, wherein the processor is configured to:
receive, from a requester, a request for a first electronic transaction, wherein the first electronic transaction is associated with a first transaction account of the requester;
obtain a first geographic location associated with the request for the electronic transaction;
transmit, to the transaction account database, a query for an identification of a plurality of second transaction accounts that are registered to conduct location-based electronic transactions at the first geographic location;

receive, from the transaction account database, the identification of the plurality of second transaction accounts;

utilize the transaction account database to determine whether the first transaction account is registered to conduct the location-based electronic transactions;

when the first transaction account is not registered to conduct the location-based electronic transactions:

prompt the requester to choose the third transaction account from the plurality of second transaction accounts, wherein the first electronic transaction will be directed to the third transaction account, and wherein the prompt the requester to choose the third transaction account from plurality of second transaction accounts comprises:

utilizing a graphical user interface (GUI) to display a map that comprises the first geographic location; and superimposing icons on top of the map, wherein there is a one-to-one correspondence between each of the icons and each transaction account of the plurality of second transaction accounts, and wherein choosing the third transaction account is performable by selecting one of the icons;

prompt the requester to provide the proposed details of the first electronic transaction; and prompt the requester to execute the first electronic transaction; and when the first transaction account is registered to conduct the location-based electronic transactions:

retrieve, from the transaction history database, a first transaction history of the first transaction account, wherein the first transaction history is associated with the first geographic location;

utilize the first transaction history to suggest a third transaction account and proposed details of the first electronic transaction, wherein the first electronic transaction will be directed to the third transaction account;

prompt the requester to make any necessary changes with respect to the third transaction account and the proposed details of the first electronic transaction; and prompt the requester to execute the first electronic transaction.

10. The system of claim 9, wherein the suggesting of the third transaction account and the proposed details of the electronic transaction comprises:

determining, by the processor, how many of the plurality of second transaction accounts correspond to the first transaction history; and when at least one of the plurality of second transaction accounts corresponds to a transaction of the first transaction history, utilizing, by the processor, the at least one of the plurality of second transaction accounts and the transaction of the first transaction history to perform the suggesting of the third transaction account and the proposed details of the first electronic transaction, respectively.

11. The system of claim 10, wherein when none of the previous transactions of the requester corresponds to the first geographic location, the prompt the requester to choose the third transaction account comprises:

utilizing a graphical user interface (GUI) to display a map that comprises the first geographic location; and superimposing icons on top of the map, wherein:
there is a one-to-one correspondence between each of the icons and each transaction account of the plurality of second transaction accounts; and choosing the third transaction account is performable by selecting one of the icons.

12. The system of claim 10, wherein a most recent one of the previous transactions of the requester that corresponds to the first geographic location is used for performing the suggesting of the third transaction account and the proposed details of the first electronic transaction.

13. The system of claim 9, wherein the first electronic transaction comprises:
a debit from the first transaction account of the requester; and
a credit to the third transaction account.

14. The system of claim 9, wherein the first electronic transaction comprises:
a credit to the first transaction account of the requester; and
a debit from the third transaction account.

15. The system of claim 9, wherein when the first transaction account is not registered to conduct the location-based electronic transactions, the processor is further configured to:
register the first transaction account to conduct the location-based electronic transactions when the requester executes the first electronic transaction.

16. The system of claim 9, wherein the location-based electronic transaction service further comprises:
an electronic transaction location service that communicates with the transaction account database; and
an electronic transaction processing service that communicates with the transaction history database.

17. A non-transitory computer-readable medium for implementing a location-based electronic transaction service, wherein the computer-readable medium stores instructions that, when executed by a processor, cause the processor to perform operations comprising:

receiving, from a requester, a request for a first electronic transaction, wherein the first electronic transaction is associated with a first transaction account of the requester;

obtaining a first geographic location associated with the request for the first electronic transaction;

transmitting, to a transaction account database, a query for an identification of a plurality of second transaction accounts that are registered to conduct location-based electronic transactions at the first geographic location;

receiving, from the transaction account database, the identification of the plurality of second transaction accounts;

utilizing the transaction account database to determine whether the first transaction account is registered to conduct the location-based electronic transactions;

when the first transaction account is not registered to conduct the location-based electronic transactions:

prompting the requester to choose the third transaction account from the plurality of second transaction accounts, wherein the first electronic transaction will be directed to the third transaction account, and wherein the prompting the requester to choose the third transaction account from the plurality of second transaction accounts comprises:

utilizing a graphical user interface (GUI) to display a map that comprises the first geographic location; and superimposing icons on top of the map, wherein there is a one-to-one correspondence between each of the icons and each transaction account of the plurality of second transaction accounts, and wherein choosing the third transaction account is performable by selecting one of the icons;

prompting the requester to provide proposed the details of the first electronic transaction; and prompting the requester to execute the first electronic transaction; and when the first transaction account is registered to conduct the location-based electronic transactions:

retrieving, from a transaction history database, a first transaction history of the first transaction account, wherein the first transaction history is associated with the first geographic location;

utilizing the first transaction history to suggest a third transaction account and proposed details of the first electronic transaction, wherein the first electronic transaction will be directed to the third transaction account;

prompting the requester to make any necessary changes with respect to the third transaction account and the proposed details of the first electronic transaction; and prompting the requester to execute the first electronic transaction.

18. The computer-readable medium of claim 17, wherein the suggesting of the third transaction account and the proposed details of the electronic transaction comprises:

determining how many of the plurality of second transaction accounts correspond to the first transaction history; and when at least one of the plurality of second transaction accounts corresponds to a transaction of the first transaction history, utilizing, by the processor, the at least one of the plurality of second transaction accounts and the transaction of the first transaction history to perform the suggesting of the third transaction account and the proposed details of the first electronic transaction, respectively.

19. The computer-readable medium of claim 18, wherein when none of the previous transactions of the requester corresponds to the first geographic location, the prompting the requester to choose the third transaction account comprises:

utilizing a graphical user interface (GUI) to display a map that comprises the first geographic location; and superimposing icons on top of the map, wherein:

there is a one-to-one correspondence between each of the icons and each transaction account of the plurality of second transaction accounts; and choosing the third transaction account is performable by selecting one of the icons.

20. The computer-readable medium of claim 17, wherein when the first transaction account is not registered to conduct the location-based electronic transactions, the instructions cause the processor to perform further operations comprising:

registering the first transaction account to conduct the location-based electronic transactions when the requester executes the first electronic transaction.

* * * * *